United States Patent
Ishida et al.

(10) Patent No.: US 10,923,297 B2
(45) Date of Patent: Feb. 16, 2021

(54) SWITCH MONITORING DEVICE, SWITCH STATE DETECTION CIRCUIT, AND A VEHICLE-MOUNTED SWITCH SYSTEM

(71) Applicant: Rohm Co., Ltd., Kyoto (JP)

(72) Inventors: Hiroyoshi Ishida, Kyoto (JP); Hideki Matsubara, Kyoto (JP); Hiroki Yamakami, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 239 days.

(21) Appl. No.: 16/109,927

(22) Filed: Aug. 23, 2018

(65) Prior Publication Data
US 2019/0066938 A1 Feb. 28, 2019

(30) Foreign Application Priority Data

Aug. 24, 2017 (JP) .................. 2017-161248
Aug. 31, 2017 (JP) .................. 2017-167112
Jul. 31, 2018 (JP) .................. 2018-144096

(51) Int. Cl.
*H01H 1/60* (2006.01)
*B60R 16/03* (2006.01)
*H01H 9/16* (2006.01)

(52) U.S. Cl.
CPC ............ *H01H 1/605* (2013.01); *B60R 16/03* (2013.01); *H01H 9/167* (2013.01)

(58) Field of Classification Search
CPC .......... H01H 1/605; H01H 9/167; G05F 1/56
See application file for complete search history.

(56) References Cited

U.S. PATENT DOCUMENTS

| | | | |
|---|---|---|---|
| 5,523,633 A | 6/1996 | Imaizumi et al. | |
| 2005/0231877 A1 | 10/2005 | Komatsu et al. | |
| 2011/0095744 A1* | 4/2011 | Unetich | G05F 1/56 323/311 |
| 2014/0300208 A1 | 10/2014 | Yamamoto et al. | |
| 2016/0268897 A1* | 9/2016 | Pan | G11C 5/147 |

FOREIGN PATENT DOCUMENTS

| | | |
|---|---|---|
| JP | 2879807 | 1/1999 |
| JP | 3625474 | 12/2004 |
| JP | 6154176 | 6/2017 |

* cited by examiner

*Primary Examiner* — John W Poos
(74) *Attorney, Agent, or Firm* — Fish & Richardson P.C.

(57) ABSTRACT

A switch monitoring device includes a constant current source which supplies a current to an input line or extracts a current from the input line, a switch which connects the input line to a supply voltage or to a ground voltage, a comparator which compares a voltage on the input line with a reference voltage, a logic which receives an output voltage of the comparator, a base current source which generates a base current, and a bias current circuit which generates a bias current by adjusting the base current as a base in accordance with a current control signal from the logic and the output voltage of the comparator. The constant current source generates a current by adjusting the bias current as a base.

20 Claims, 9 Drawing Sheets

SWITCH MONITORING DEVICE, SWITCH STATE DETECTION CIRCUIT, AND A VEHICLE-MOUNTED SWITCH SYSTEM

CROSS-REFERENCE TO RELATED APPLICATIONS

This application is based on the following Japanese Patent Applications, the contents of which are hereby incorporated by reference: No. 2017-161248 (filed on Aug. 24, 2017); No. 2017-167112 (filed on Aug. 31, 2017); and No. 2018-144096 filed on Jul. 31, 2018).

BACKGROUND OF THE INVENTION

1. Field of the Invention

The present invention relates to a switch monitoring device for use, for example, in a vehicle.

The present invention also relates to a switch state detection circuit which detects the open/closed state of a switch, the contact state of a connector, for example, and a vehicle-mounted switch system.

2. Description of Related Art

First Background Art:

For control of the security system, the door lock, the power window, etc., the body control module (BCM) has conventionally been used in vehicles. In the BCM, the well-known electronic control unit (ECU) is used. The ECU has a function of detecting states of a plurality of switches in a vehicle by means of processors such as a central processing unit (CPU) and a micro processing unit (MPU) disposed in the ECU to perform processing in accordance with an operation performed by a user. Regardless of the operation of the engine of the vehicle, the ECU needs to detect the states of the switches provided in the vehicle. It is thus desirable to reduce an amount of battery power consumed by the ECU.

With reference to FIG. 1 and FIG. 2 of Japanese Patent No. 6154176 (hereinafter, Patent Document 1), a switch detection circuit 1 includes N connection terminals (11-1 to 11-N), N switching switches (12-1 to 12-N), a connection line 13, a detection circuit 14, a power adjustment circuit 15, a control circuit 16, a storage circuit 17, and a communication circuit 18. To detect the open/closed state of the opening/closing switches (2-1 to 2-N), first a constant current Ia from the power adjustment circuit 15 is supplied to the connection line 13. Then, the detection circuit 14 detects the open/closed state of the opening/closing switch connected to the connection line.

FIG. 4 is a circuit diagram illustrating a switch monitoring device 400, which is a configuration example of conventional switch monitoring devices the inventors of the present invention examined before making the present invention.

The switch monitoring device 400 includes a switch SW1, a constant current source CC1, a comparator COMP1, a reference voltage VREF1, a logic LOGIC, a base current source BC1, a bias current circuit BCC1, and a microcomputer MCU. The constant current source CC1, the comparator COMP1, the reference voltage VREF1, the logic LOGIC, the base current source BC1, and the bias current circuit BCC1 are integrated in one integrated circuit LSI.

One terminal of the switch SW1 is connected to a ground voltage GND, and the other terminal of the switch SW1 is connected to one terminal of the constant current source CC1 and to a non-inverting input terminal (+) of the comparator COMP1. The other terminal of the constant current source CC1 is connected to a power supply voltage VCC. One terminal of the reference voltage VREF1 is connected to the ground voltage GND, and the other terminal of the reference voltage VREF1 is connected to an inverting input terminal (−) of the comparator COMP1. An output of the comparator COMP1 is connected to the logic LOGIC. The logic LOGIC receives the output of the comparator COMP1, and transfers the result to the microcomputer MCU by using serial communication (serial peripheral interface (SPI) communication, for example). On receiving the communication from the logic LOGIC, the microcomputer MCU gives instructions to an unillustrated driver, for example. The base current source BC1 is connected to the bias current circuit BCC1, and the bias current circuit BCC1 is connected to the constant current source CC1. Further, current control signals IS1_1 to IS1_N from the logic LOGIC are connected to the bias current circuit BCC1.

A brief description will be given of the operation of the switch monitoring device 400 of the present configuration example. The switch monitoring device 400 detects the opening/closing of the switch SW1. The switch SW1 is a user interface used, for example, to change the position of a door mirror. For example, when the switch SW1 is open, it indicates that the door mirror is in the open position, while when the switch SW1 is closed, it indicates that the door mirror is in the closed position.

The constant current source CC1 supplies a current to an input line VN1. With the switch SW1 open, the voltage on the input line VN1 is substantially equal to the power supply voltage VCC. With the switch SW1 closed, the voltage on the input line VN1 is substantially equal to the ground voltage GND. This voltage variation is detected by the comparator COMP1. Accordingly, the reference voltage VREF1 is set so as to be lower than the power supply voltage VCC but higher than the ground voltage GND. Such a reference voltage VREF1 is, for example, 3 V.

The output voltage VO1 of the comparator COMP1 is at high level with the switch SW1 open, and is at low level with the switch SW1 closed. The logic LOGIC receives this output voltage VO1, and transmits it to the microcomputer MCU via the SPI communication.

The base current source BC1 generates a base current IBase. The bias current circuit BCC1 receives the current control signals IS1_1 to IS1_N from the logic LOGIC, and amplifies the base current IBase into a desired bias current IBias1, and outputs the thereby obtained bias current IBias1. The bias current IBias1 has a current amount in accordance with the current control signals IS1_1 to IS1_N. The constant current source CC1 amplifies the bias current IBias1 and outputs the amplified bias current IBias1. Here, the bias current circuit BCC1 and the constant current source CC1 are each constituted with a current mirror circuit, which is known well.

The constant current source CC1 supplies the switch SW1 with a current the switch SW1 needs. The amount of current supplied here varies depending on the kind of the switch SW1. Since different kinds of switches need different amounts of current, the amount of current to be supplied is adjusted by the bias current circuit BCC1.

FIG. 5 shows a circuit example of the bias current circuit BCC1 which the inventors of the present invention examined before making the present invention.

The bias current circuit BCC1 is capable of outputting, for example N bias currents IBias1. This is achieved by connecting the current control signals IS1_1 to IS1_N from the logic LOGIC to the bias current circuit BCC1.

A system that uses the current control signal IS1_1 will be described first.

The base current IBase is connected to the drain of a MOS transistor M1, and the source of the MOS transistor M1 is connected to the ground voltage GND. The gates of the MOS transistor M1 to M3 are commonly connected to the drain of the MOS transistor M1. The sources of the MOS transistors M2, M3, like the source of the MOS transistor M1, are connected to the ground voltage GND. That is, the MOS transistors M1 to M3 form a mirror current circuit, which is known well. Here, it is assumed that the MOS transistor M3 is 99 times as large as the MOS transistor M1. That is, the current generated by the MOS transistor M3 is 99 times as large as the base current IBase.

The drain of the MOS transistor M3 is connected to the source of a MOS transistor M4. The drain of the MOS transistor M4 is commonly connected to the drain of the MOS transistor M2 to form a bias current IBias1.

The current control signal IS1_1 is connected to the gate of the MOS transistor M4.

When, with the current control signal IS1_1 at high level, the MOS transistor M4 is turned on, the bias current circuit BCC1 outputs a bias current IBias1 that is 100 times as large as the base current IBase.

Next, a system of the current control signal IS1_N will be described. It is assumed, for example, that a bias current IBias1 that is 50 times as large as the base current IBase is outputted in the system of the current control signal IS1_N. A MOS transistor M5 is added to the current mirror circuit based on the MOS transistor M1 to make the size of the mirror circuit 49 times as larger. The source of the MOS transistor M5 is connected to the ground voltage GND. To the drain of the MOS transistor M5, the source of a MOS transistor M6 is connected, and to the gate of the MOS transistor M6, the current control signal IS1_N is connected. The drain of the MOS transistor M6 and the drain of the MOS transistor M4 are commonly connected to the drain of the MOS transistor M2.

Forming N such connections makes it possible to output N patterns of bias currents IBias1.

Second Background Art:

Known examples of the switch state detection circuit and the switch system are disclosed in Patent Document 1. These switch state detection circuit and switch system are used as, for example, one of vehicle-mounted devices, together with a control device such as a microcomputer. The result of detection of the state of each switch is notified to the control device, and this enables the control device to perform a control in accordance with the state of each switch.

With reference to FIG. 1 and FIG. 2 of Patent Document 1, the switch detection circuit 1 includes N connection terminals (11-1 to 11-N), N switching switches (12-1 to 12-N), the connection line 13, the detection circuit 14, the power adjustment circuit 15, the control circuit 16, the storage circuit 17, and the communication circuit 18. The open/closed state of each of opening/closing switches (2-1 to 2-N) are detected by the detection circuit 14 with the constant current Ia supplied from the current adjustment circuit 15 to the connection line 13.

Japanese Patent No. 3625474 (hereinafter, Patent Document 2) relates to a contact point corrosion prevention circuit which is provided with a function of destroying an oxide film with a current, the oxide film resulting from corrosion at a contact point of a switch, a connector, and the like. The contact point corrosion prevention circuit described in Patent Document 2 includes an input terminal which is connected to an external contact point, an input signal line 140 which is connected to the input terminal and of which the potential is used for making a determination on the connection state at the contact point, a low impedance means 141 which is connected to the input signal line 140 and is activated into a state where the low impedance means 141 is able to pass a current for preventing corrosion of the contact point to the input terminal, a high impedance means 142 which is connected to the input signal line 140, and a comparison means 143 which compares the potential on the input signal line 140 with a predetermined potential that would invite corrosion of a contact point, and the low impedance means 141 is activated by the output of the comparison means 143.

With reference to FIG. 1 and FIG. 4 of Patent Document 2, there is illustrated an example where a low-side switch 120, which is illustrated in FIG. 1(b), is connected to the low side (the ground potential side) of the input terminal 13, while a high-side switch 130 is connected to the high side (power supply side) of the input terminal 13. Here, switching elements 147, 167 correspond to a low impedance means for supplying a current to the low-side switch 120 side and to the high-side switch 130 side, and a contact point corrosion prevention circuit 102Cx, which includes these switching elements, is incorporated in an LSI (a semiconductor integrated circuit).

Japanese Patent No. 2879807 (hereinafter, Patent Document 3), like Patent Document 2, discloses a corrosion prevention circuit for a switch. In particular, Patent Document 3 relates to a corrosion prevention circuit which allows a large current switch mounted on a vehicle or the like to be used as a signal input switch in a current reduction system in an electronic unit.

With reference to FIG. 1 of Patent Document 3, an electronic unit 4 incorporates a signal generation circuit 4a, and the base of a switching transistor Tr is connected to the output terminal of the signal generation circuit 4a. A large current switch 1, which is a target of corrosion prevention and where a comparatively large current flows, has one terminal thereof connected to one terminal of a resistor R2, and the other terminal of the resistor R2 is connected to the input terminal of the electronic unit 4. A signal from the switch 1 is processed in the electronic unit 4, and turning-on control of a lamp 3 or the like is performed. According to Patent Document 3, at a time point when the switch 1 becomes ON, a current of about 1 mA flows into the switch 1 via a resistor R1, and, in synchronism with a pulse from the signal generation circuit 4a, a current of about 200 mA flows into the switch 1 via the switching transistor Tr, a resistor R3, and a diode D, to reduce a contact resistance formed at a contact point of the switch 1.

First Object:

In the switch monitoring device 400, which the inventors of the present invention examined before making the present invention, the current consumed in the bias current circuit BCC1 is determined based on the current control signals IS1_1 to IS1_N from the logic LOGIC. Thus, regardless of whether the switch is open or closed, a current constantly flows in the bias current circuit BCC1, and this leads to large power consumption.

The switch state detection circuit described in Patent Document 1 performs a state detection operation with respect to a plurality of switches in time division, and thus the power consumption is small. However, EMI noise depending on the operation cycle of the switch state detection circuit may be generated.

The present invention has been made to overcome the above-described problem, and its object is to reduce generation of EMI noise and power consumption in a switch monitoring device.

Second Object:

Patent Document 1 describes that the switch state detection circuit is for detecting the states of a plurality of opening/closing switches, that there is prepared a constant current circuit that performs supply (source) of a constant current that pulls out a connection line to which an opening/closing switch is connected, or a constant current circuit that performs pulling out (sink) of a constant current that pulls down the connection line, that the detected state is notified to a control device such as a microcomputer via a detection circuit, and that the opening/closing switches are a front door, a rear door, a sunroof, etc. of a vehicle. It is admitted that Patent Document 1 has many regions overlapping with the summary of the present invention, which will be given later. However, though the opening/closing switch disclosed in Patent Document 1 is connected to an external terminal of an LSI, the current used to detect the open/closed state of the opening/closing switch is controlled by a constant current source and an internal switch incorporated in the LSI. Accordingly, Patent Document 1 is disadvantageous in that it cannot cope with a case where a comparatively large current flows through a switch and the constant current source incorporated in the LSI is too small to drive the switch. In particular, as disclosed in Patent Documents 2 and 3, there may be a case where a large current is supplied to an opening/closing switch to prevent or remove corrosion at the contact point of the switch, but it is difficult to cope with such a case with Patent Document 1.

This is the case with Patent Document 2, as well as with Patent Document 1. That is, the low impedance means incorporated in the corrosion prevention circuit and the switch (a gate circuit) that controls this low impedance means are both incorporated in the LSI, and no consideration is given to a configuration where both a constant current and a switch to turn on/off the constant current re provided outside the LSI.

Patent Document 3 teaches that a comparatively large current (200 mA, for example) is supplied to a large current switch by means of an output pulse from a signal generation circuit incorporated in an LSI (an electronic unit), and thus seems to disclose a technical idea that is not suggested either in Patent Document 1 or 2. However, Patent Document 3 does not suggest providing, inside the LSI, an internal current generator used in detecting the open/closed state of the large current switch. Besides, it is limited to a configuration where the large current switch is connected to the ground potential side, and does not disclose or suggest a configuration where the large current switch is connected to the power supply terminal (battery) side.

The present invention has been made to solve the problems existing in the above-mentioned patent documents, and an object of the present invention is to provide a switch state detection circuit that is capable of easily coping with a case of additionally providing, outside an LSI, an unexpected new opening/closing switch and an external switch for controlling the opening/closing of the opening/closing switch, and a vehicle-mounted switch system using such a switch state detection circuit.

SUMMARY OF THE INVENTION

Solution to First Problem

According to one aspect of the present invention, a switch monitoring device includes a constant current source which supplies a current to an input line or extracts a current from the input line, a switch which connects the input line to a power supply voltage or to a ground voltage, a comparator which compares a voltage on the input line with a reference voltage, a logic which receives an output voltage of the comparator, a base current source which generates a base current, and a bias current circuit which generates a bias current by adjusting the base current as a base in accordance with a current control signal from the logic and the output voltage of the comparator. Here, the constant current source generates a current by adjusting the bias current as a base.

Solution to Second Problem

According to another aspect of the present invention, a switch state detection circuit includes a first serial connection body in which an internal current generator and an internal switch are serially connected to each other, and a second serial connection body in which an external current generator and an external switch are serially connected to each other. Here, the first serial connection body is disposed inside a semiconductor integrated circuit, the second serial connection body is disposed outside the semiconductor integrated circuit, the semiconductor integrated circuit is provided with a plurality of external terminals, the first serial connection body and the second serial connection body are connected to a connection line via one of the external terminals, an opening/closing control signal for controlling the internal switch is extracted to one of the external terminals of the semiconductor integrated circuit, the opening/closing control signal is used to control opening/closing of the external switch so as to control the opening/closing of the internal switch and the opening/closing of the external switch in a manner interlocked with each other, at least one of a current generated by the internal current generator and a current generated by the external current generator is supplied to an opening/closing switch is externally connected to the semiconductor integrated circuit and which is serially connected between the second serial connection body and a power supply terminal or between the second serial connection body and a ground potential, and a potential generated at the connection line or a current generated at the connection line is detected to detect an open/closed state of the opening/closing switch. With these embodiments, it is possible to easily handle adding a serial connection body constituted with an opening/closing switch and an external switch.

Other features, constituent components, operational steps, advantages, and characteristics of the present invention will be further clarified by the following detailed descriptions of best modes and accompanying drawings related thereto.

DETAILED DESCRIPTION OF PREFERRED EMBODIMENTS

Hereinafter, embodiments of the present invention will be described with reference to the accompanying drawings.

Figure 1:
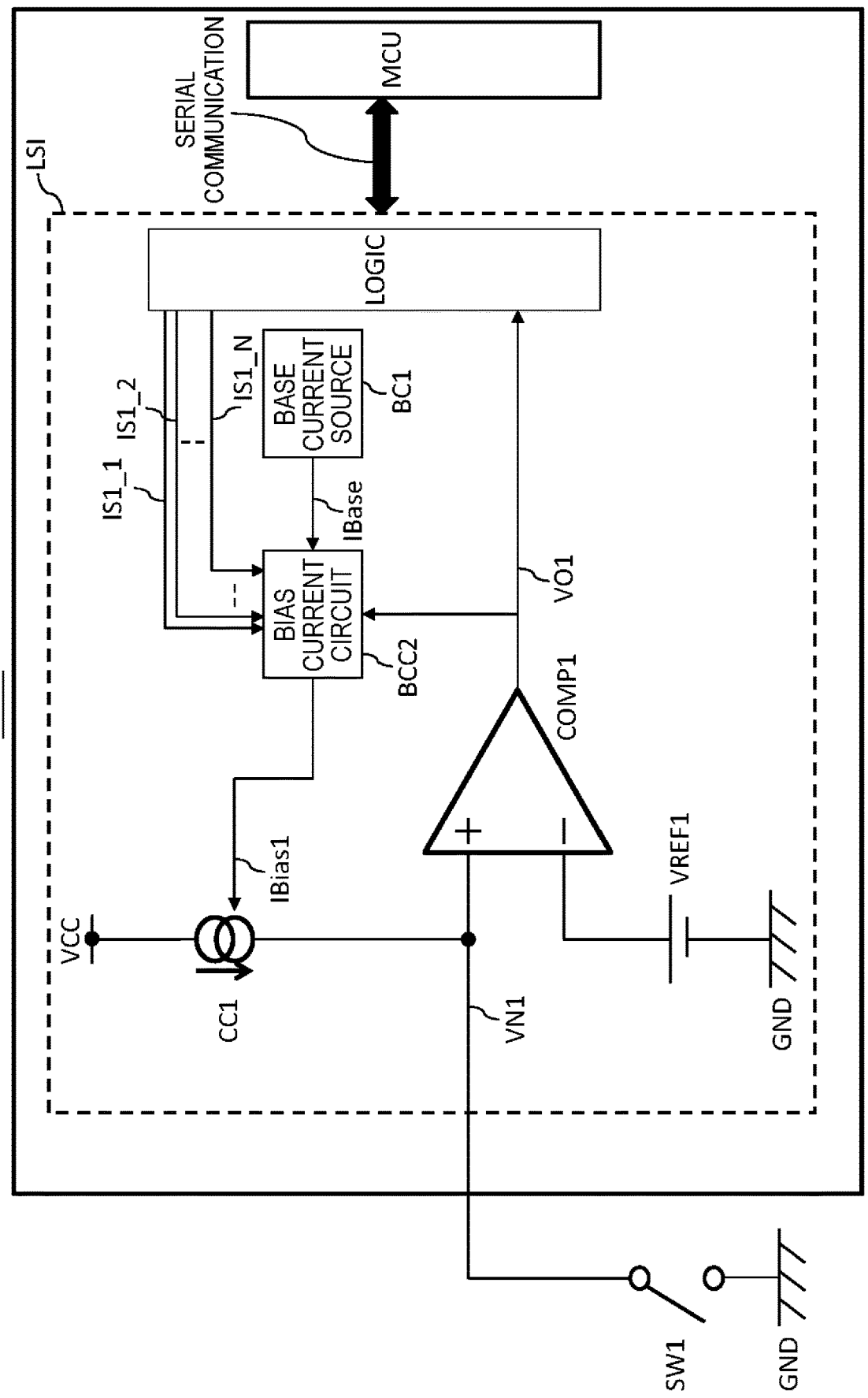
FIG. 1 is a diagram illustrating an example of the configuration of a switch monitoring device 100 according to the present invention.

FIG. 1 shows an example of the configuration of a switch monitoring device 100 according to the present invention. The switch monitoring device 100 according to the present invention is obtained by replacing a bias current circuit BCC1 in a switch monitoring device 400 of FIG. 4 with a bias current circuit BCC2 such that the bias current circuit BCC2 is controlled by means of an output voltage VO1 of a comparator COMP1.

The basic operation in FIG. 1 is mostly similar to the basic operation in FIG. 4, and the following description will be given with reference to FIG. 1.

The switch monitoring device 100 detects opening/closing of a switch SW1. The switch SW1 is a user interface used, for example, to change the position of a door mirror. For example, when the switch SW1 is open, it indicates that the door mirror is in the opened position, while when the switch SW1 is closed, it indicates that the door mirror is in the closed position.

A constant current source CC1 supplies a current to an input line VN1. With the switch SW1 open, the voltage level of the input line VN1 is substantially equal to that of a power supply voltage VCC. With the switch SW1 closed, the voltage level of the input line VN1 is substantially equal to that of a ground voltage GND. This voltage variation is detected by a comparator COMP1. Accordingly, a reference voltage VREF1 is set to a voltage that is lower than the power supply voltage VCC but is higher than the ground voltage GND. The reference voltage VREF1 is, for example, 3 V.

An output voltage VO1 of the comparator COMP1 is at high level with the switch SW1 open, and is at low level with the switch SW1 closed. This output voltage VO1 is received by a logic LOGIC, which notifies the state of the switch SW1 to a microcomputer MCU via serial communication. The output voltage VO1 is connected also to a bias current circuit BCC2. This makes it possible for the bias current circuit BCC2 to be informed of whether the switch SW1 is open or closed, and thus to perform current control in accordance with the open/closed state of the switch SW1.

A base current source BC1 generates a base current IBase. The bias current circuit BCC2 receives current control signals IS1_1 to IS1_N from the logic LOGIC, amplifies the base current IBase into a desired bias current IBias1, and outputs the bias current IBias1. The bias current IBias1 has a current amount in accordance with the current control signals IS1_1 to IS1_N. The constant current source CC1 amplifies the bias current IBias1, and outputs the amplified bias current IBias1. In the description of the present example, for ease of description, it is assumed that the constant current source CC1 performs the amplification to a fixed degree; however, the degree of the amplification by the constant current source CC1 is changeable by connecting another current control signal from the logic LOGIC. Here, the bias current circuit BCC2 and the constant current source CC1 are constituted with a current mirror circuit, which is known well.

The constant current source CC1 supplies the switch SW1 with a current the switch SW1 needs. The amount of current supplied here varies depending on the kind of the switch SW1. The amount of current to be supplied, which needs to be changed depending on the kind of a switch, is adjusted by the bias current circuit BCC2.

With the switch SW1 closed, the constant current source CC1 needs to supply an amount of current in accordance with the kind of the switch SW1. However, with the switch SW1 open, regardless of the kind of the switch SW1, a current of an amount sufficient to stabilize the output voltage VO1 of the comparator COMP1 is supplied. The amount of current is, for example, 100 µA.

Figure 2:
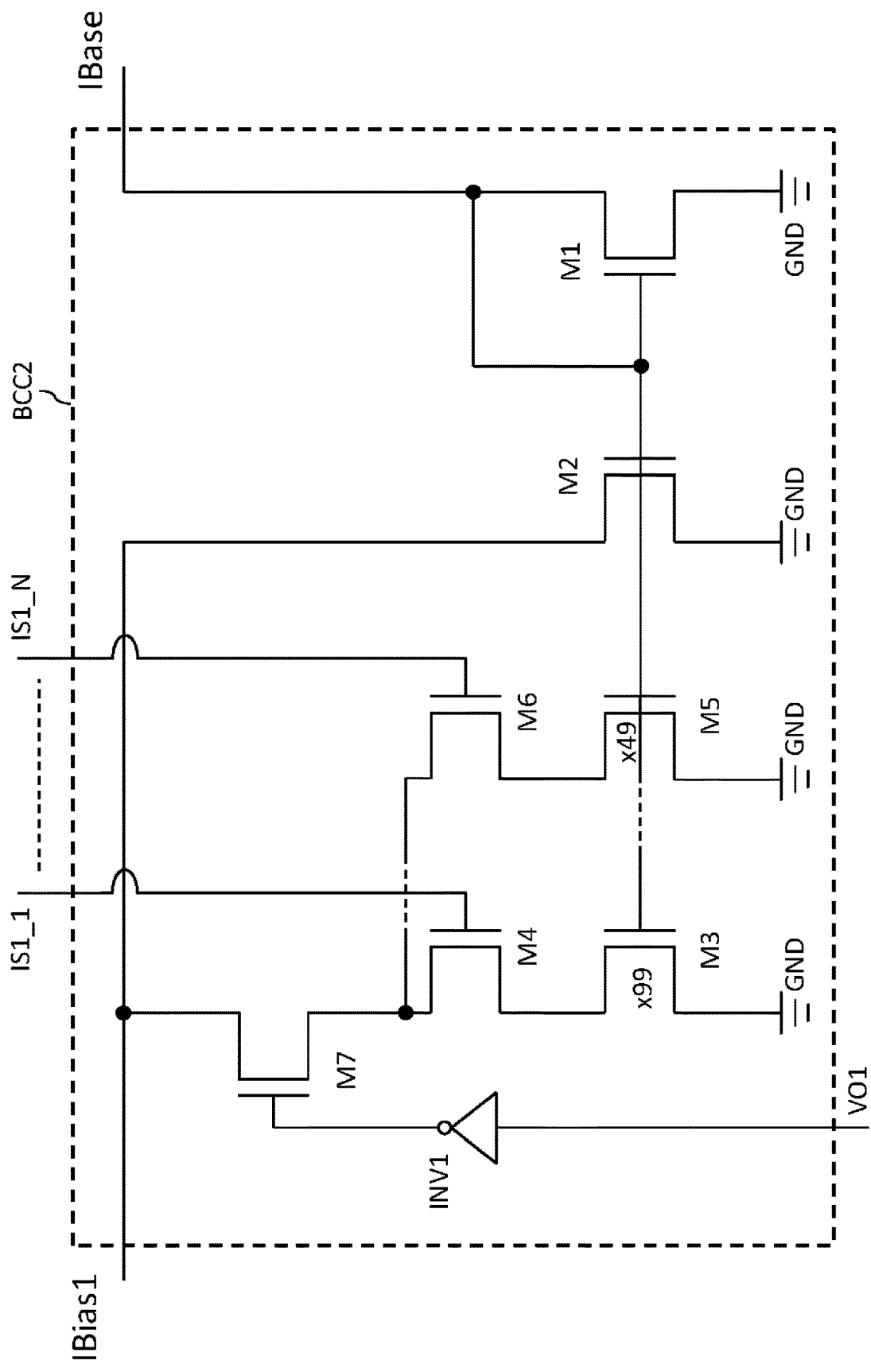
FIG. 2 is a diagram illustrating an example of the configuration of a bias current circuit BCC2 according to the present invention.
Figure 5:
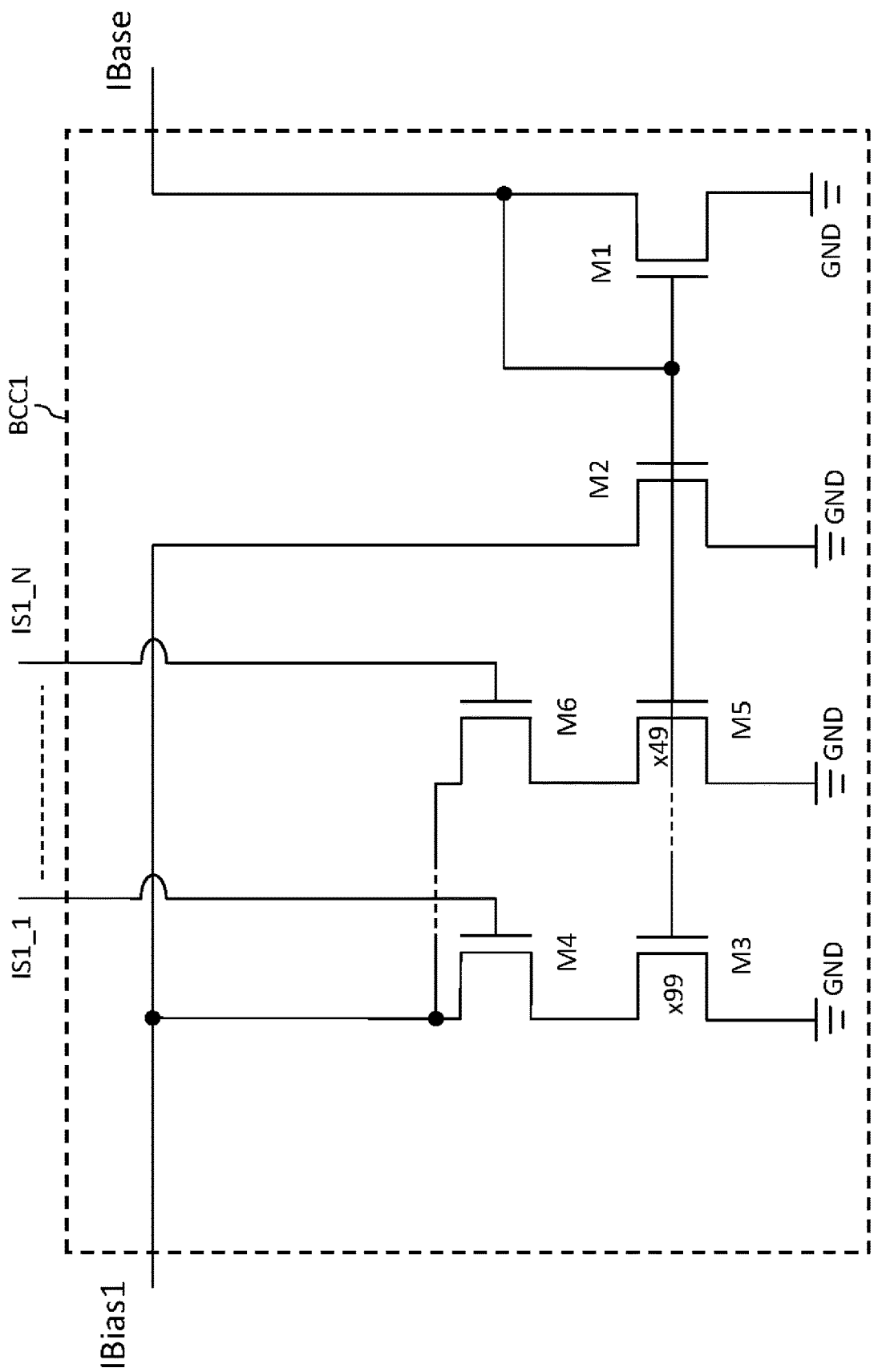
FIG. 5 is a diagram illustrating the configuration of a bias current circuit BCC1, which the inventors of the present invention examined before making the present invention.

FIG. 2 shows an example of the configuration of the bias current circuit BCC2 according to the present invention. The bias current circuit BCC2 is obtained by adding, to the bias current circuit BCC1 of FIG. 5, a MOS transistor M7 and an inverter INV1.

The bias current circuit BCC2 is capable of outputting, for example, N bias currents IBias1. This is achieved by connecting current control signals IS1_1 to IS1_N from the logic LOGIC to the bias current circuit BCC2.

A system that uses the current control signal IS1_1 will be described first.

The base current IBase is connected to the drain of a MOS transistor M1, and the source of the MOS transistor M1 is connected to the ground voltage GND. The gates of the MOS transistors M1 to M3 are commonly connected to the drain of the MOS transistor M1. The sources of the MOS transistors M2 and M3, like the source of the MOS transistor M1, are connected to the ground voltage GND. That is, the MOS transistors M1 to M3 form a mirror current circuit, which is known well. Here, it is assumed that the MOS transistor M3 is, for example, 99 times as large as the MOS transistor M1. That is, the current generated by the MOS transistor M3 is, for example, 99 times as large as the base current IBase.

The drain of the MOS transistor M3 is connected to the source of a MOS transistor M4. To the gate of the MOS transistor M4, the current control signal IS1_1 is connected.

Between the bias current IBias1 and the drain of the MOS transistor M4, a MOS transistor M7 is connected. To the gate of the MOS transistor M7, the output of the inverter INV1 is connected, and to the input of the inverter INV1, the output voltage VO1 of the comparator COMP1 is connected.

The drain of the MOS transistor M7 is commonly connected to the drain of the MOS transistor M2 to form the bias current IBias1.

Next, a system of the current control signal IS1_N will be described. It is assumed, for example, that the bias current IBias1 that is outputted in the system of the current control signal IS1_N is, for example, 50 times as large as the base current IBase. To the current mirror circuit based on the MOS transistor M1, a MOS transistor M5 is added to increase the size of the current mirror circuit by, for example, 49 times. The source of the MOS transistor M5 is connected to the ground voltage GND. To the drain of the MOS transistor M5, the source of a MOS transistor M6 is connected, and to the gate of the MOS transistor M6, the current control signal IS1_N is connected. The drain of the MOS transistor M6 is commonly connected to the drain of the MOS transistor M4.

Forming N such connections makes it possible to output N patterns of bias currents IBias1.

That is, the bias current circuit BCC2 is controlled by means of the current control signals IS1_1 to IS1_N and the output voltage VO1.

When the output voltage VO1 is at low level and the current control signal IS1_1 is at high level, the bias current IBias1 outputted from the bias current circuit BCC2 is, for example, 100 times as large as the base current IBase. When the output voltage VO1 is at low level and the current control signal IS1_N is at high level, the bias current IBias1 outputted from the bias current circuit BCC2 is, for example, 50 times as large as the base current IBase. That is, with the switch SW1 closed, the bias current circuit BCC2 outputs the bias current IBias1 in accordance with the setting of the current control signals IS1_1 to IS1_N.

On the other hand, when the output voltage VO1 is at high level, regardless of the setting of the current control signals IS1_1 to IS1_N, the bias current IBias1 outputted from the bias current circuit BCC2 is, for example, one time as large as the base current IBase. That is, with the switch SW1 open, the bias current circuit BCC2 outputs the bias current IBias1 of the same amount as the base current IBase.

Here, for ease of understanding, an additional description will be given by taking, as an example, a case where the current control signal IS1_1 is at high level, in other words, where the bias current IBias1 that is 100 times as large as the base current IBase is outputted.

Referring back to FIG. 1, further descriptions will be given. As already mentioned earlier, the difference from the switch monitoring device 400 of FIG. 4 is that the bias current circuit BCC2 is controlled by means of the output voltage VO1 of the comparator COMP1. That is, information regarding the open/closed state of the switch SW1 is given to the bias current circuit BCC2.

First, a case will be considered where the switch SW1 is in the closed state. The voltage on the input line VN1 becomes substantially equal to the ground voltage GND. As a result, the output voltage VO1 of the comparator COMP1 becomes low level. Accordingly, the MOS transistor M7 illustrated in FIG. 2 is turned on, and there is no operational difference from FIG. 5. The consumed current in the bias current circuit BCC2 is 100 times as large as the base current IBase.

Next, a case will be considered where the switch SW1 is in the open state. The voltage on the input line VN1 becomes substantially equal to the power supply voltage VCC. As a result, the output voltage VO1 of the comparator COMP1 becomes high level. Accordingly, the MOS transistor M7 illustrated in FIG. 2 is turned off, and thus a path controlled by means of the current control signal IS1_1, namely, a path for a current-mirror current generated at the MOS transistor M3, is interrupted. As a result, the consumed current in the bias current circuit BCC2 is one time as large as the base current IBase. Accordingly, the consumed current in the case where the switch SW1 is in the open state is 1/100 as large as the consumed current of the case where the switch SW1 is in the closed state.

Although only one switch system of the switch SW1 is illustrated in FIG. 1 for ease of drawing, the switch monitoring device 100 may monitor many switches. For example, the switch monitoring device 100 may monitor 33 switches. In that case, 33 sets of the switch SW1, the input line VN1, the comparator COMP1, the output voltage VO1, the current control signals IS1_1 to IS1_N, the bias current IBias1, and the constant current source CC1 are prepared.

In a case where, for example, 33 current sources each corresponding to the constant current source CC1 are prepared, the current sources are denoted as, for example, the constant current sources CC1 to CC33. If base current sources BC1 to BC33 are respectively prepared for the constant current sources CC1 to CC33, variation in current value increases between them, and the variation appears as variation in current value between the constant current sources CC1 to CC33, which is not preferable. Thus, this case is coped with by increasing the number of current mirror paths in the bias current circuit BCC2. That is, the number of the combination of the MOS transistors M2 to M7 and the inverter INV1 illustrated in FIG. 2 is increased to a total of 33 sets.

Assume that 33 switches corresponding to the switch SW1 are prepared, and 33 paths are respectively formed for the switches SW1 to SW33. In a case where the switches SW1 to SW33 are all open, a consumed current Ibcc2 in the bias current circuit BCC2 is as below.

$$Ibcc2 = 33 \times IBase$$

In a case where 33 paths are formed in the configuration of the bias current circuit BCC1 of the switch monitoring device 400 illustrated in FIG. 4, a consumed current Ibcc1 in the bias current circuit BCC1 is as below.

$$Ibcc1 = 33 \times (IBase \times 100)$$

Figure 4:
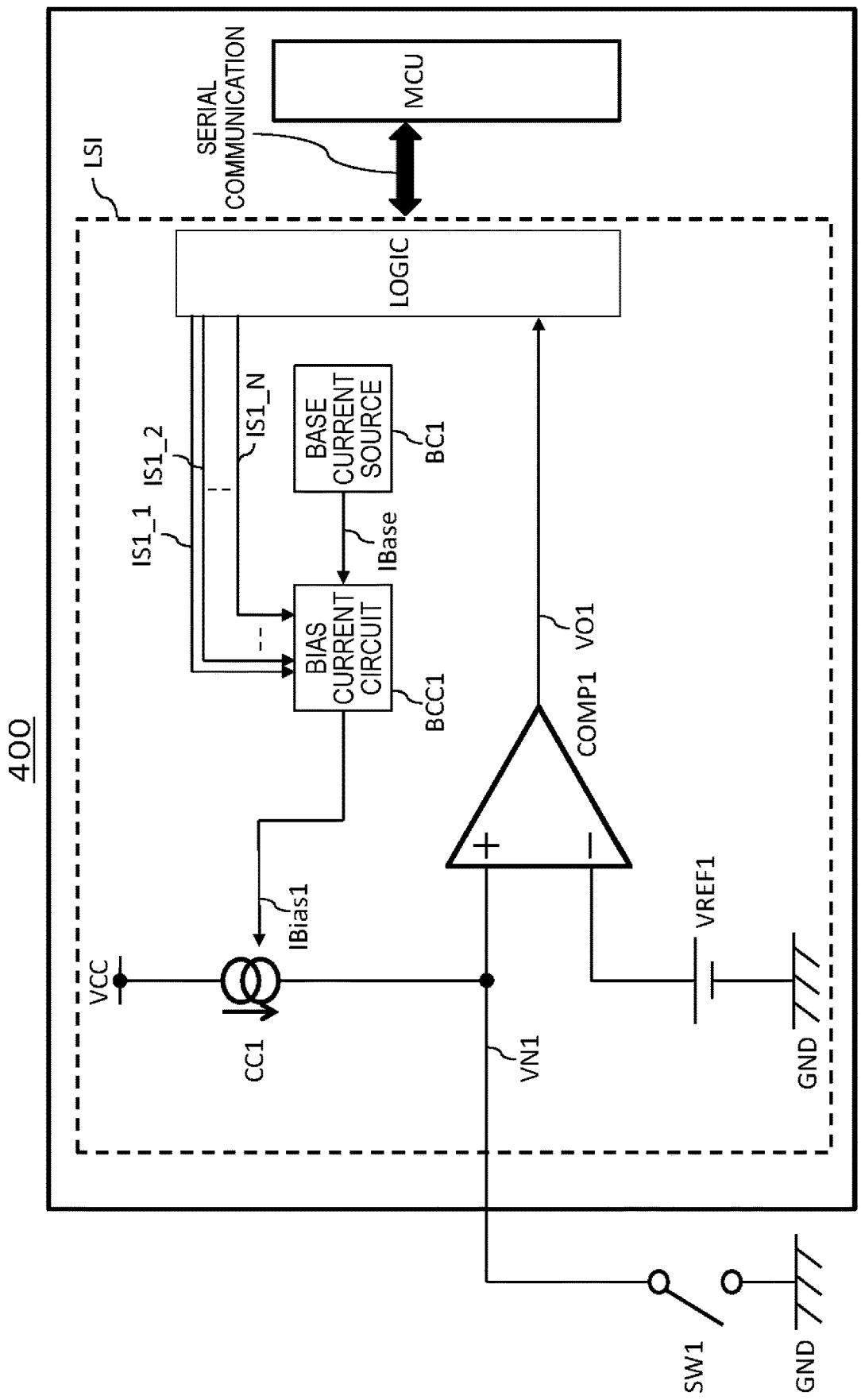
FIG. 4 is a diagram illustrating the configuration of a switch monitoring device 400, which the inventors of the present invention examined before making the present invention.

Thus, it is clear, from the following equation, that the consumed current Ibcc2 in the bias current circuit BCC2 of the switch monitoring device 100 illustrated in FIG. 1 is 1/100 as large as the consumed current Ibcc2 in the bias current circuit BCC1 of the switch monitoring device 400 illustrated in FIG. 4.

$$Ibcc2/Ibcc1 = 1/100$$

Further, the switch monitoring device 100 will be compared with the switch detection circuit of Patent Document 1. It is assumed that, in Patent Document 1, detection is performed with respect to 33 paths of switches in time division by one constant current source and one bias current circuit. In this case, a consumed current I1 in the bias current circuit is as below.

$$I1 = (IBase \times 100)$$

Thus, it is clear from the following equation that the consumed current Ibcc2 in the bias current circuit BCC2 of the switch monitoring device 100 illustrated in FIG. 1 is 33/100 as large as the consumed current I1 in the bias current circuit of the switch detection circuit of Patent Document 1.

$$Ibcc2/I1 = 33/100$$

In a case of controlling switches for 100 paths, the consumed current Ibcc2 in the bias current circuit BCC2 of the switch monitoring device 100 illustrated in FIG. 1 would be equal to the consumed current I1 in the bias current circuit of the switch detection circuit described in Patent Document 1. However, in a case where detection is performed by the switch detection circuit of Patent Document 1 with respect to switches for 100 paths in time division, there may be a problem in responsiveness; in contrast, with the switch monitoring device 100 illustrated in FIG. 1, detection is performed with respect to the switches for the 100 paths independently of each other, and thus with no adverse effect on responsivity. The responsiveness mentioned here is the response rapidity with which a door mirror or the like responses to a change of a switch from the open state to the closed state or from the closed state to the open state.

Further, in the switch detection circuit of Patent Document 1, which detects the states of a plurality of switches in time division, EMI noise occurs in accordance with its operation cycle, but in the switch monitoring device 100 illustrated in FIG. 1, where the current path is always in the on state, there is no risk of occurrence of cyclic EMI noise.

Thus, by using the switch monitoring device 100 illustrated in FIG. 1, it is possible to achieve a switch monitoring device with reduced EMI noise and reduced consumed current.

A consideration will now be given to actually laying out the switch monitoring device 100 as an integrated circuit LSI.

Figure 3:
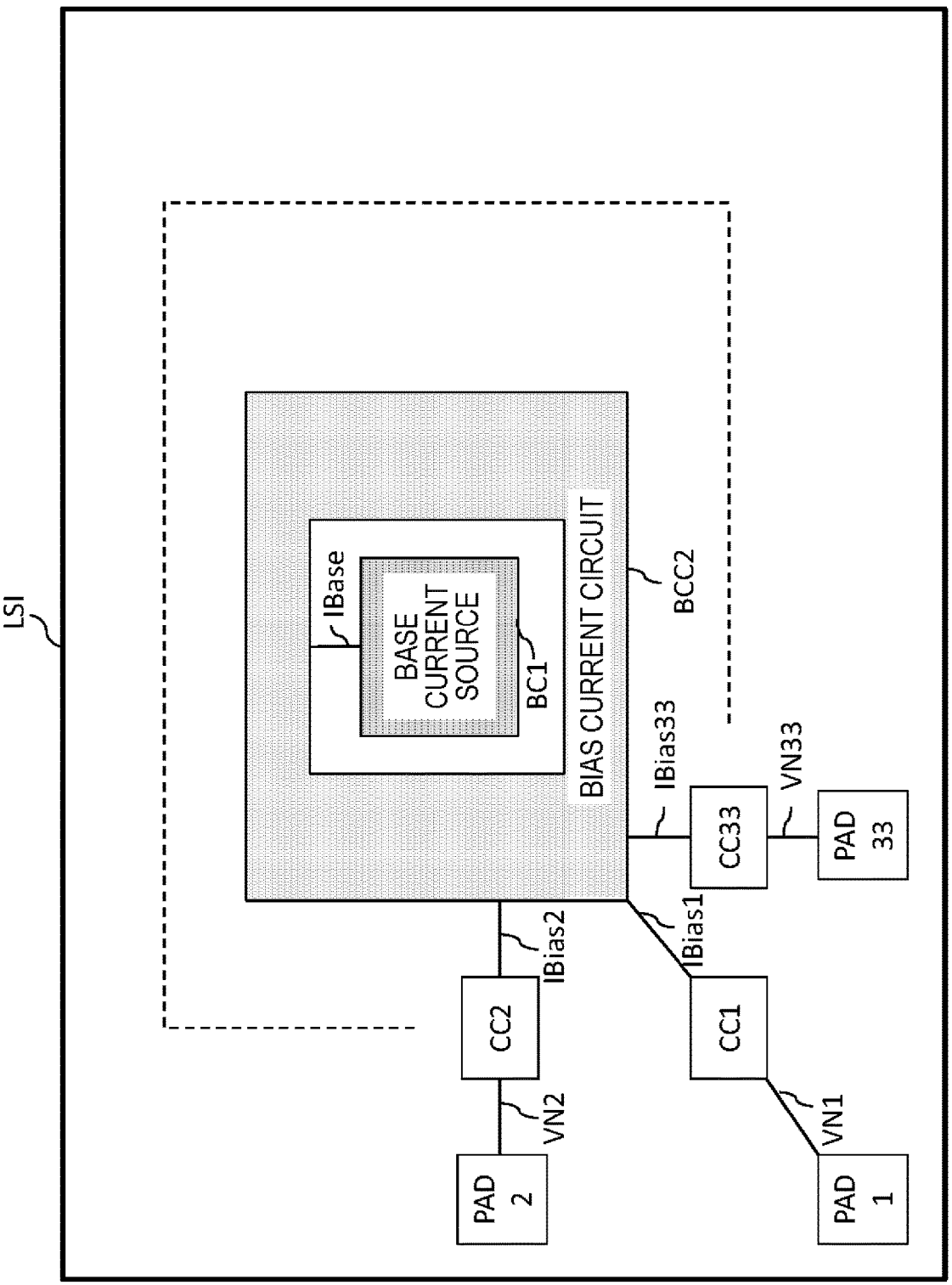
FIG. 3 is a diagram illustrating a layout image of a base current source BC1, a bias current circuit BCC2, a constant current sources CC1 to CC33, and pads PAD1 to PAD33.

FIG. 3 shows a layout image of the base current source BC1, the bias current circuit BCC2, the constant current sources CC1 to CC33, and the pads PAD1 to PAD33.

Below will be described how the base current source BC1, the bias current circuit BCC2, the constant current sources CC1 to CC33, and the pads PAD1 to PAD33 are arranged on the layout. The base current source BC1 serves as a base for the constant current sources CC1 to CC33, and thus its current accuracy should be as high as possible. For such high current accuracy, the base current source BC1 is desirably disposed in a central part of the integrated circuit LSI.

The bias current circuit BCC2 is desirably disposed close to the base current source BC1. Because of its small absolute current value, the base current IBase is vulnerable to effects of current leakage and various noises resulting from wiring in the integrated circuit LSI. Thus, a short wiring distance is desirable for the base current IBase. Inside the bias current circuit BCC2, 33 paths of current mirror circuits are provided. Since it is desirable that relative variation among these paths be low, it is desirable that these paths be arranged close to each other.

The constant current sources CC1 to CC33 are connected to outside the integrated circuit LSI via the pads PAD1 to PAD33, which are disposed at an outer peripheral part of the integrated circuit LSI to be connected to switches SW1 to SW33. Thus, the constant current sources CC1 to CC33 are disposed more outwardly than the bias current circuit BCC2. The constant current sources CC1 to CC33 each generate a comparatively large current, and thus act as heat sources in the integrated circuit LSI. From the view point of heat dissipation from the integrated circuit LSI, it is desirable that the constant current sources CC1 to CC33 be arranged in a scattered manner.

In the present invention, for example, the constant current source CC1 has an amplification factor of 100 times, and the bias current circuit BCC2 has an amplification factor of 100 times, to achieve a maximum amplification factor of 10000 times in total. Assume a configuration where, for example, the constant current source CC1 has a variable amplification factor of which the maximum is 10000 times, and the bias current circuit BCC2 is omitted. That is, the base current IBase from the base current source BC1 is directly connected to the constant current source CC1. In such a case, by connecting the current control signals IS1_1 to IS1_N from the logic LOGIC to the constant current source CC1, it is made possible to adjust the current value of the constant current source CC1.

The consumed current in the case of this configuration is less than that in the case of the switch monitoring device 100 illustrated in FIG. 1 due to the absence of the bias current circuit BCC2. However, the base current IBase of the base current source BC1 needs to be wired inside the integrated circuit LSI, and becomes vulnerable to the effects of current leakage and various noises. The current leakage and various noises cause no particular problem with the switches SW1 to SW33 open, but with the switches SW1 to SW33 closed, they cause a problem of instability in current supplied from the constant current sources CC1 to CC33. The base current IBase is, because of its small absolute value, strongly affected by current leakage, and this disadvantageously results in variation in current value among the constant current sources CC1 to CC33. Besides, the base current IBase is wired over a long distance inside the integrated circuit LSI, and thus becomes vulnerable to the effects of various noises, and this causes instable current values of the constant current sources CC1 to CC33.

However, in the configuration of the switch monitoring device 100 illustrated in FIG. 1, the bias current IBias1 has a small absolute value when the switches SW1 to SW33 are open, but has a value of some extent when the switches SW1 to SW33 are closed. Thereby, it is less vulnerable to the effects of current leakage and various noises. Accordingly, it can be said that the configuration of the present invention, where the bias current IBias1 has a value of a certain extent, is more desirable.

The above description of the present invention has dealt with a case where the input line VN1 is grounded by the switch SW1, but the present invention is usable also in a case where the input line VN1 is connected to a high voltage (for example, VCC) by the switch SW1. In that case, the constant current source CC1 is arranged between the input line VN1 and the ground voltage GND, such that a current flows from the constant current source CC1 to ground voltage GND. And, the logic of the output voltage VO1 of the comparator COMP1 fed to the bias current circuit BCC2 is appropriately changed.

The present invention is not limited to a current mirror circuit constituted with MOS transistors. The similar advantages are achievable with a current mirror circuit constituted with bipolar transistors.

Figure 6:
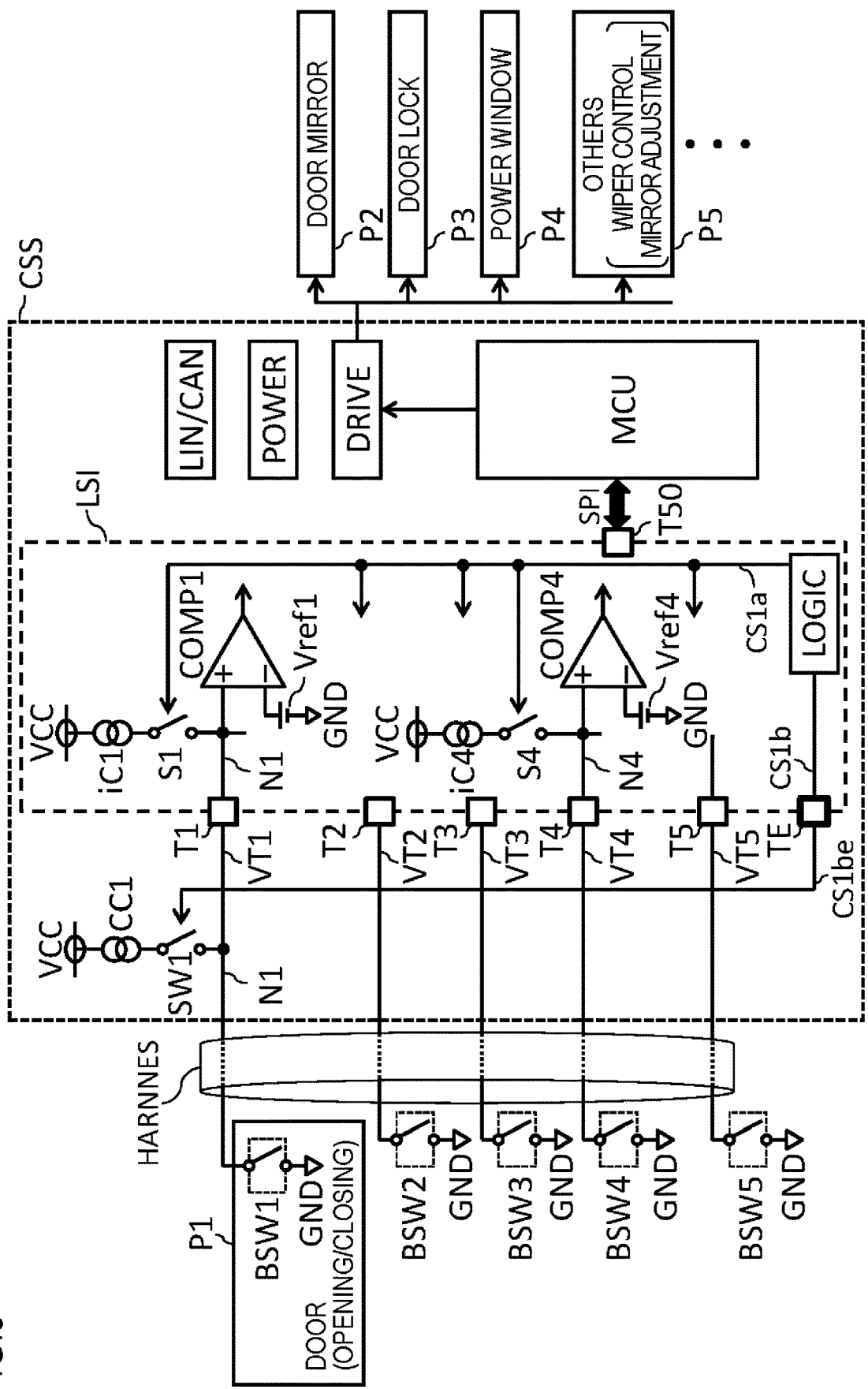
FIG. 6 is a configuration diagram illustrating a switch state detection circuit and a vehicle-mounted switch system according to the present invention.

FIG. 6 illustrates a switch state detection circuit and a vehicle-mounted switch system CSS according to the present invention. The switch state detection circuit and the vehicle-mounted switch system according to the present invention include a semiconductor integrated circuit LSI, a plurality of external terminals T1 to T5, and a current source enable external terminal TE as another external terminal, which are disposed on the exterior of the integrated circuit LSI. There are further included an external current generator CC1, an external switch SW1, and opening/closing switches BSW1, BSW2, BSW3, BSW4, and BSW5, etc., which are connected to the external terminals T1 to T5 and the current source enable external terminal TE, and which are prepared on the exterior of the semiconductor integrated circuit LSI.

Between the external terminal T1 and a power supply terminal VCC, the external current generator CC1 and the external switch SW1 are serially connected, and the opening/closing switch BSW1 is connected between the external terminal T1 and a ground potential (indicated by inverted-triangle symbols). Thus, between the power supply terminal VCC and the ground potential, the external current generator CC1, the external switch SW1, and the opening/closing switch BSW1 are serially connected. A connection line N1 is connected to one terminal of the opening/closing switch BSW1 and to the external terminal T1, such that a predetermined current is supplied to the connection line N1 from the external current generator CC1 and from an internal current generator iC1, which will be described later. Specifically, the internal current generator iC1 and the external current generator CC1 may each be formed with a current mirror having a transistor as its main element or with a circuit using a resistor. The current generators in the following descriptions also have such a circuit configuration. Such a circuit configuration is disposed in the semiconductor integrated circuit LSI not just in a single stage, but in twelve stages, for example. Accordingly, twelve equivalents of the external terminal T1 are prepared. The opening/closing switch BSW1 is a switch that indicates the open/closed state of a door (opening/closing door) P1, for example. A state where the door (open/closed) P1 is "open", that is, the door (opening/closing door) P1 is in an open state, corresponds to an "open" state of the opening/closing switch BSW1. A state where the door (opening/closing door) P1 is "closed", that is, the door (opening/closing door) P1 is in a closed state, corresponds to a "closed" state of the opening/closing switch BSW1. In the following descriptions, when a switch is "open", regardless of whether the switch is an opening/closing switch or a switch of another type, it indicates that the switch is in an "OFF" state, and when the switch is "closed", it indicates that the switch is in an "ON" state.

The external terminal T2 has connected thereto an opening/closing switch BSW2 which is used to control a door mirror of a vehicle, for example. The opening/closing switch BSW2 is connected to the ground potential side. Further, FIG. 6 illustrates a state where the external terminal T2 does not have connected thereto circuit means equivalent to the external current generator CC1 and the external switch SW1, which are connected between the external terminal T1 and the power supply terminal VCC. The plurality of external terminals include external terminals that are not provided with circuit means equivalent to the external current generator CC1 and the external switch SW1.

The external terminal T3 has connected thereto an opening/closing switch BSW3 which is used to control a door lock of a vehicle, for example. The opening/closing switch BSW3 is connected to the ground potential side. As in the case of the external terminal T2, FIG. 6 illustrates a state where the external terminal T3 does not have connected thereto circuit means equivalent to the external current generator CC1 and the external switch SW1, which are connected between the external terminal T1 and the power supply terminal VCC.

The external terminal T4 has connected thereto an opening/closing switch BSW4 which is used to control a power window of a vehicle, for example. Here, a power window is a mechanism for opening/closing vehicle windows, and it is well-known in this technical field. The target of the control of the power window is, for example, the window beside each of the seats, or all the windows beside the seats. The opening/closing switch BSW4 is connected to the ground potential side. As in the cases of the external terminals T2 and T3, FIG. 6 shows a state where the external terminal 4 does not have connected thereto circuit means equivalent to the external current generator CC1 and the external switch SW1, which are connected between the external terminal T1 and the power supply terminal VCC.

The external terminal T5 has connected thereto an opening/closing switch BSW5, which is not connected to the external terminals T1 to T4, and which is used for other functions including wiper control and mirror adjustment. The opening/closing switch BSW5 is connected to the ground potential side. FIG. 6 shows a state where circuit means equivalent to the external current generator CC1 and the external switch SW1 connected between the external terminal T1 and the power supply terminal VCC is not connected to the external terminal T5, as is the case for the external terminals T2 to T4.

Here, the opening/closing switches BSW1 to BSW5 are coupled to the semiconductor integrated circuit LSI and the vehicle-mounted switch system CSS via a wire harness HARNESS.

Although, for convenience of description and ease of drawing, the above description assumes that only the external terminal T1 is provided with circuit means equivalent to the external current generator CC1 and the external switch SW1, a variety of circuit configurations are possible for a variety of purposes and usages of the switch state detection circuit. For example, an external current generator and an external switch, neither of which being illustrated, may be connected between the external terminal T2 and the power supply terminal VCC.

As to the current source enable terminal TE, which is prepared as an external terminal, a description will be given later.

The semiconductor integrated circuit LSI is mounted in, for example, a 48-pin Quad-Flat-No-lead (QFN) package, which is lead-free. In FIG. 6, for convenience of description and ease of drawing, only the external terminals T1 to T5 and the current source enable terminal TE are illustrated, but 33 pins of external terminals, for example, are prepared which are connectable to a variety of opening/closing switches, which consist almost 70% of the whole 48 pins. Besides, there is prepared an external terminal T50 for serial communication with the MCU via a serial peripheral interface (SPI) and an Inter IC (IIC). The detection of the open/closed state of each of the opening/closing switches BSW1 to BSW5 is performed in accordance with a value of an unillustrated register, which is disposed inside the semiconductor integrated circuit LSI, based on the semiconductor integrated circuit LSI's request for serial communication SPI to the microcomputer MCU and subsequent serial communication SPI from the microcomputer MCU. The result of the detection is transmitted to the microcomputer MCU by serial communication SPI via the external terminal T50. Further, in response to instructions from the microcomputer MCU, the result of the detection is notified by means of a lamp inside the vehicle, by sound, etc.

The vehicle-mounted switch system CSS according to the present invention is applicable to the Local Interconnect Network (LIN) and the Controller Area Network (CAN), which are vehicle-mounted network protocols. LIN is positioned as a sub-bus for CAN, and is advantageous in that it can be configured at lower cost than CAN. In whichever case, the vehicle-mounted switch system CSS according to the present invention is provided with the switch state detection circuit according to the present invention, and with the switch state detection circuit according to the present invention, a vehicle-mounted switch system, and thus one constituent component of an electronic control unit (ECU) of particularly the body system of a vehicle are constituted.

A power supply POWER generates a power supply voltage for driving the semiconductor integrated circuit LSI and the vehicle-mounted switch system CSS, and is constituted with, for example, a PWM switching regulator. A drive DRIVE is a circuit for driving a motor for controlling the door (opening/closing) P1 to the others P5.

The semiconductor integrated circuit LSI incorporates internal current generators iC1 and iC4, internal switches S1 and S4, comparators COMP1 and COMP4, a logic circuit LOGIC, etc. In addition to these, although not illustrated for lack of space in the figure, the semiconductor integrated circuit LSI incorporates another internal current generator which has connected thereto an internal switch, a comparator, and so on.

Now, as mentioned above, the current source enable terminal TE is prepared for the semiconductor integrated circuit LSI. Addition of an external terminal to a semiconductor integrated circuit LSI necessitates a larger package for the semiconductor integrated circuit LSI, and thus leads to higher cost, and hence, generally, it is not preferred to add an external terminal to semiconductor integrated circuits LSI. However, in the present invention, a large number of pins, namely, 48 pins, of external terminals are provided, and thus adding the current source enable terminal TE does not lead to a disadvantageous cost increase. Actually, it has been found that effective use of one of the large number of pins makes it easy to add a new switch state detection circuit (LOGIC) for detecting the states of the switches (such as S1 and S4) inside the switch state detection circuit, and further helps circuit and system function check.

A current source enable signal CS1 be extracted to the current source enable terminal TE is one of opening/closing control signals, and is generated based on an opening/closing control signal CS1a which controls the internal switches S1 and S4, the opening/closing control signal CS1a being received from the logic circuit LOGIC. This makes it possible to constitute the internal switches S1 and S4 and the external switch SW1 with transistors of the same conductive type. For example, these switches may each be constituted with a PMOS transistor or a PNP bipolar transistor. In a case where it is desired that the internal switches S1 and S4 have a polarity reverse to that of the external switch SW1, the opening/closing control signal CS1a extracted to the current source enable terminal TE is inverted at the logic circuit LOGIC, and the inverted control signal is used to control the external switch SW1. Or, the opening/closing control signal CS1a extracted to the current source enable terminal TE may be inverted by an inverter, to use the inverted control signal to control the external switch SW1. Furthermore, it is preferable that an opening/closing control signal CS1b, which is extracted from the logic circuit LOGIC to the current source enable terminal TE, and the opening/closing control signal CS1a be extracted from the same circuit point in the logic circuit LOGIC. This is because setting the current source enable terminal TE forcibly to high level or low level makes it easy to check the circuit function of the semiconductor integrated circuit LSI. That is, by switching the current source enable terminal TE to high level or low level and measuring, for example, an external terminal potential VT1 at the external terminal T1, it becomes possible to easily and securely check whether or not circuit connection of the internal current generator iC1 and the internal switch S1 to each other is appropriate, and whether or not the value of current generated by the internal current generator iC1 is within a predetermined range. This applies also to the external terminals other than the external terminal T1, and it is possible to easily and securely measure (check) whether the opening/closing switch BSW1 is open or closed.

The opening/closing control of the internal switch S1 and that of the external switch SW1 are performed in an interlocked manner. The interlocked manner here specifically means a state where when the internal switch S1 is ON, the external switch SW1 is also ON, and when the internal switch S1 is OFF, the external switch SW1 is also OFF. Furthermore, the switch state detection circuit according to the present invention has a constant monitoring operation, during which the internal switch S1 and the external switch SW1 are constantly maintained ON to constantly detect the states of the opening/closing switches BSW1 to BSW5, and an intermittent monitoring operation, during which the internal switch S1 and the external switch SW1 are intermittently turned on and off to intermittently detect the states of the opening/closing switches BSW1 to BSW5. The monitoring cycle in the intermittent monitoring operation is settable. By switching between the constant monitoring operation, the intermittent monitoring operation, and the monitoring cycle in the intermittent monitoring operation based on the value of an unillustrated register disposed inside the semiconductor integrated circuit LSI, it is possible to reduce power consumption.

Here, it is also possible, for example, to perform the checking, the measuring (examining), and the like of whether or not the circuit connection of the internal current generator iC1 and the internal switch S1 to each other is appropriate, by using an opening/closing control signal outputted from the logic circuit LOGIC side, without controlling the current source enable terminal TE. However, a signal from the logic circuit LOGIC is applied to, for example, the internal switch S1 via many flip-flops, latch circuits, etc., and this may cause a malfunction that makes it impossible to securely open and close the internal switch S1. In contrast, according to the present invention, for example, the opening/closing of the internal switch S1 is directly controlled, and thus it is possible to securely measure (examine) connections of the various circuits, the magnitude of a current generated in a current generation circuit, etc.

Figure 7:
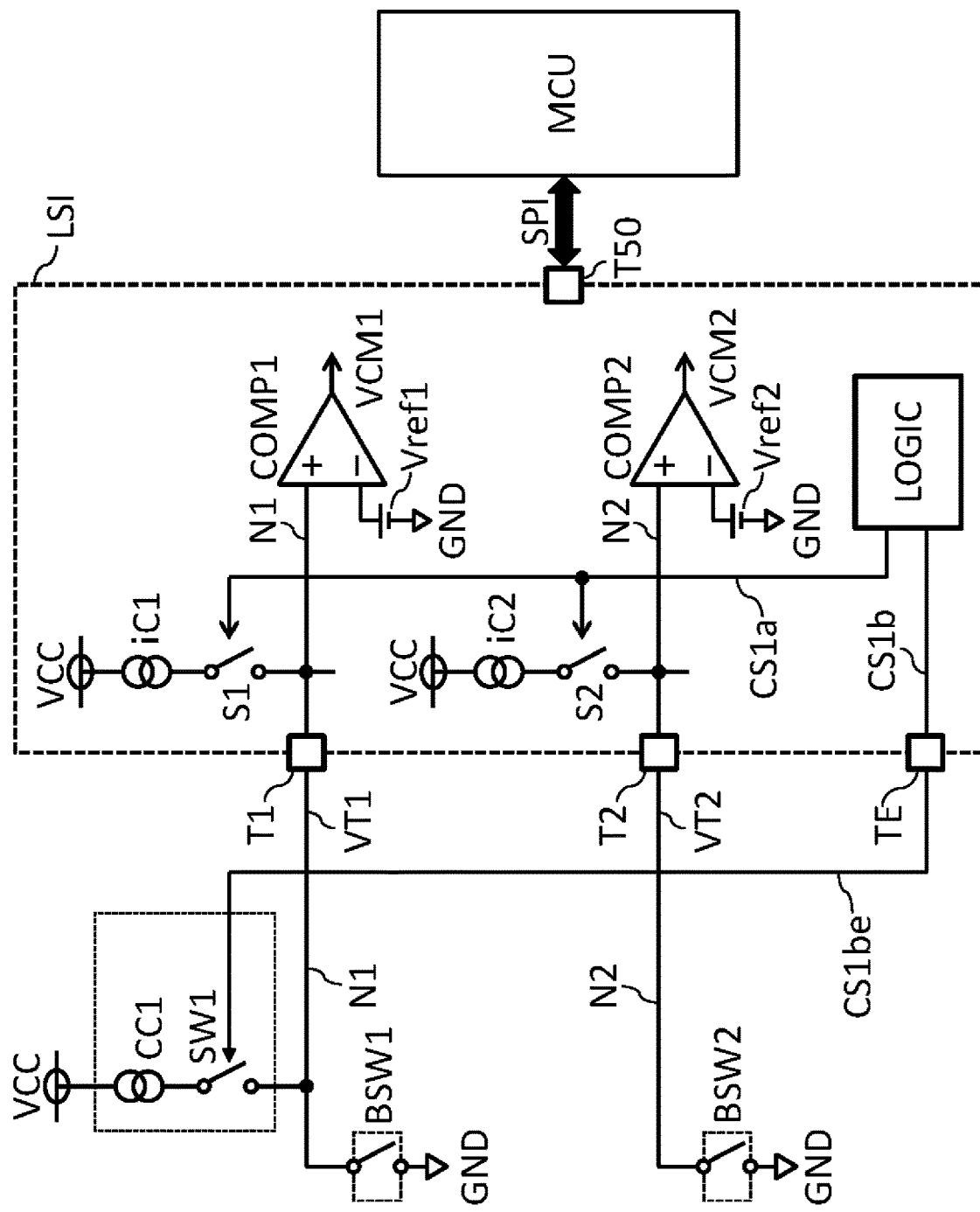
FIG. 7 is a configuration diagram prepared for supplementary illustration of the switch state detection circuit of FIG. 6.

FIG. 7 is a configuration diagram prepared for supplementing the description of the switch state detection circuit illustrated in FIG. 6. Portions in FIG. 7 the same as those in FIG. 6 are denoted with the same reference signs. The external terminal T1 of the semiconductor integrated circuit LSI is connected to the non-inverting input terminal (+) of the comparator COMP1, and a reference potential Vref1 is connected to the inverting terminal (−) of the comparator COMP1. The comparator COMP1 detects the open/closed state of the opening/closing switch BSW1. As shown in FIG. 6, the opening/closing switch BSW1 is used, for example, in the door (opening/closing) P1 of the vehicle. Whether the opening/closing switch BSW1 is ON (closed) or OFF (open) is detected by the comparator COMP1 comparing the external terminal potential VT1 of the external terminal T1 with the reference potential Vref1, with the internal switch S1 closed, with the current generated by the internal current generator iC1 supplied to the opening/closing switch BSW1 via the external terminal T1. It is possible to notify the open/closed states of the opening/closing switches by using a lamp disposed in the vehicle, by sound, etc.

With the opening/closing switch BSW1 closed, the external terminal potential VT1 is substantially equal to the ground potential, which is 0 V, and an output potential VCM1 of the comparator COMP1 is at low level (L). On the other hand, with the opening/closing switch BSW1 open, the external terminal potential VT1 is substantially equal to the potential of the power supply terminal VCC, and an output potential VCM1 of the comparator COMP1 is at high level (H). Here, it is also possible to perform the detection of the open/closed state of the opening/closing switch BSW1, without using the internal current generator iC1, by supplying the current generated by the external current generator CC1 to the opening/closing switch BSW1 via the external switch SW1 and the connection line N1. Needless to say, the detection may be performed by simultaneously activating the internal current generator iC1 and the external current generator CC1, and performing comparison of the external terminal potential VT1 by means of the comparator COMP1. Here, the current generated by the external current generator CC1 is set to be larger than the current generated by the internal current generator iC1, and the current generated by the external current generator CC1 is supplied as a current for preventing corrosion of the opening/closing switch BSW1 at least either before or after detecting the open/closed state of the opening/closing switch BSW1.

The detection of the open/closed state of the opening/closing switch BSW2 is performed by supplying the current generated by the internal current generator iC2 to the opening/closing switch BSW2 via the internal switch S2, the external terminal T2, and the connection line N2.

With the opening/closing switch BSW2 closed, the external terminal potential VT2 is substantially equal to the ground potential, which is 0 V, and an output potential VCM2 of the comparator COMP2 is at low level (L). On the other hand, with the opening/closing switch BSW2 open, the external terminal potential VT2 is substantially equal to the potential of the power supply terminal VCC, and an output potential VCM2 of the comparator COMP2 is at high level (H). The connection line N1 is connected to one terminal of the opening/closing switch BSW2 and the external terminal T2, such that the connection line N2 is supplied with a current from the internal current generator iC2.

As shown in FIG. 7, a first serial connection body constituted with the internal current generator iC1 and the internal switch S1 and a second serial connection body constituted with the external current generator CC1 and the external switch SW1 are connected to each other via the power supply terminal VCC and the external terminal T1, that is to say, the connection line N1. Such a circuit configuration makes it possible, in a case of malfunction of one of the serial connection bodies, to secure current supply from the power supply terminal VCC side toward the opening/closing switch BSW1 by means of the other one of the serial connection bodies. In other words, it is possible to have a fail-safe circuit function.

Further, in FIG. 7, it is also possible to constitute the external current generator CC1 with, for example, a resistor, and to constitute the external switch SW1 with, for example, a PMOS transistor. The resistor may be replaced with a current mirror. The internal switches S1 and S2 may each be specifically constituted with a PMOS transistor of the same conductivity type as the PMOS transistor of the external switch SW1. By using such a circuit configuration, it is possible to control the internal current generator iC1 and the external current generator CC1 in an interlocked manner by means of the same control signal outputted from the logic circuit LOGIC, and it is also possible to achieve a simple circuit configuration.

For convenience of description, only the external terminals T1 and T2, and the current source enable terminal TE are illustrated in FIG. 7. Actually, however, the external terminals T3 to T5 and other external terminals are also prepared as illustrated in FIG. 6.

Figure 8:
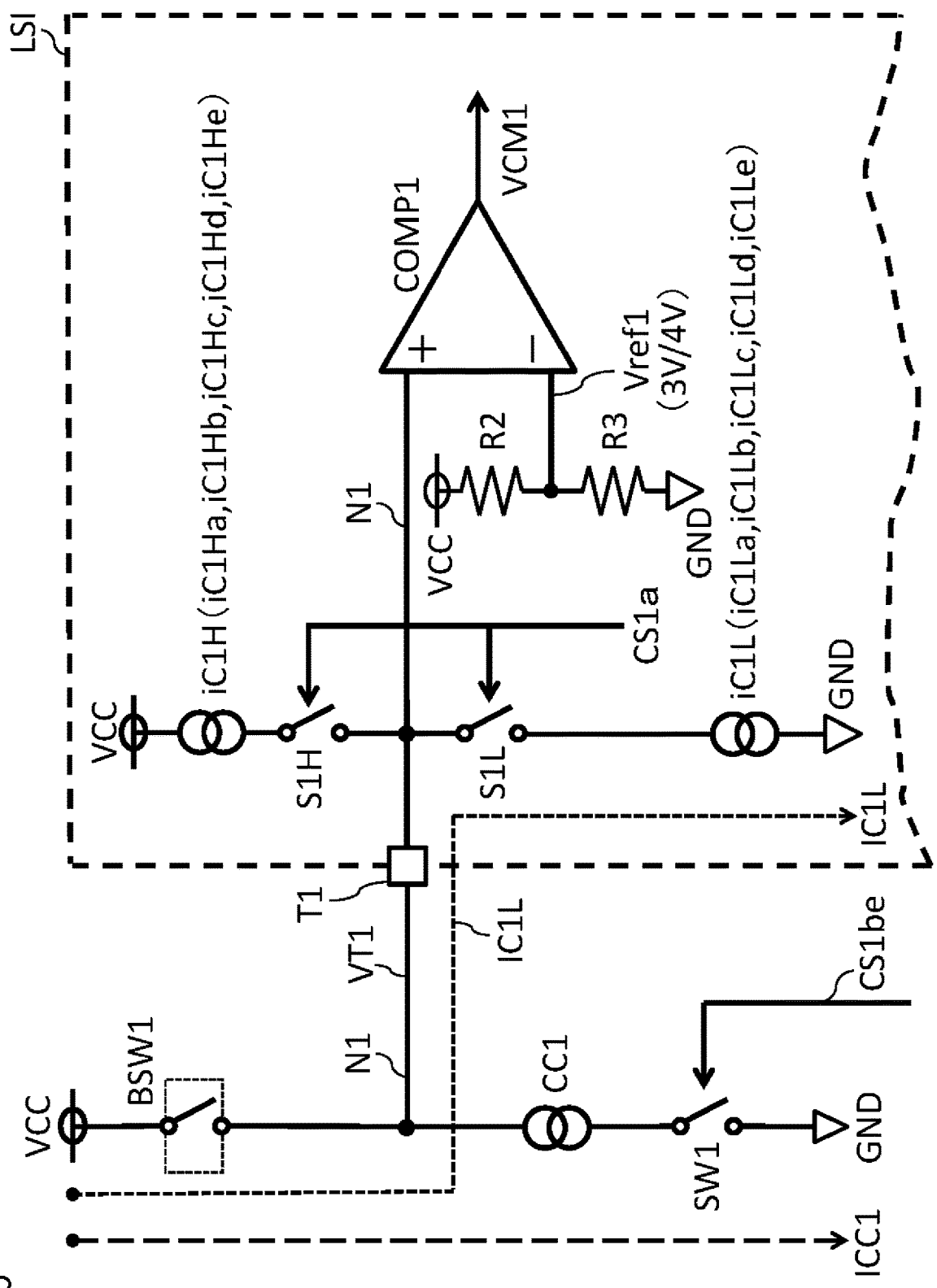
FIG. 8 is a configuration diagram illustrating how an internal current generator is connected to an opening/closing switch and to a comparator, all of which are illustrated in FIG. 6 and FIG. 7.

FIG. 8 shows a case where the opening/closing switch BSW1 is connected to the power supply terminal VCC side, and the external current generator CC1 and the external switch SW1 are connected to the ground potential GND side. This circuit configuration is different from those illustrated in FIG. 6 and FIG. 7, but is similar to those illustrated in FIG. 6 and FIG. 7 in that the detection of the open/closed state of the opening/closing switch BSW1 is performed by comparing the external terminal potential VT1 generated at the external terminal T1 and the reference potential Vref1 by means of the comparator COMP1. In FIG. 8, the external terminal potential VT1 is, for example, generated based on a current path IC1L, from the power supply terminal VCC, via the opening/closing switch BSW1, the internal switch S1L, and the internal current generator iC1L, to the ground potential GND. Here, the detection of the open/closed state of the opening/closing switch BSW1 may be performed by using a current path ICC1 constituted with the external current generator CC1 and the external switch SW1, without using the current path constituted with the internal switch S1L and the internal current generator iC1L. The serial connection body including the external current generator CC1 and the external switch SW1 and the serial connection body including the internal current generator iC1L and the internal switch S1L are connected in parallel between the external terminal T1 and the ground potential GND, and thus, according to the present invention, it is possible to detect the open/closed state of the opening/closing switch BSW1 by using at least one of the current paths. That is, even when some failure has occurred in one of the current paths, it is possible to have what is called a fail-safe function that makes it possible use the other one of the current paths to detect the open/closed state of the opening/closing switch BSW1.

It is not just a single kind of constant current that is generated by the internal current generator iC1L, but, for example, five kinds of currents iC1La, iC1Lb, iC1Lc, iC1Ld, and iC1Le having different current values are controlled and generated by a program at, for example, the logic circuit LOGIC. For example, the current values of the constant currents iC1La, iC1Lb, iC1Lc, iC1Ld, and iC1Le are respectively 1 mA, 3 mA, 5 mA, 10 mA, and 15 mA.

FIG. 8 also shows a state where the internal current generator iC1H is connected between the power supply terminal VCC and the external terminal T1 via the internal switch S1H. Under the configuration where the opening/closing switch BSW1 is connected to the power supply terminal VCC side, there is no need of using the internal current generator iC1H and the internal switch S1H, but under the configuration where the opening/closing switch BSW1 is connected to the ground potential GND side, the internal current generator iC1H and the internal switch S1H need to be used instead of the internal current generator iC1L and the internal switch S1L. It is not just a single kind of current that is generated by the internal current generator iC1H, either, but, for example, five kinds of currents iC1Ha, iC1Hb, iC1Hc, iC1Hd, and iC1He having different current values are controlled and generated by a program at, for example, the logic circuit LOGIC. For example, the current values of the currents iC1Ha, iC1Hb, iC1Hc, iC1Hd, and iC1He are respectively 1 mA, 3 mA, 5 mA, 10 mA, and 15 mA, and the current values equal to the current values of the constant currents generated by the internal current generator iC1L are selected.

FIG. 8 shows that the reference potential Vref1 given to the inverting terminal (−) of the comparator COMP1 is set at resistors R2 and R3 to, for example, 3 V or 4 V. Note that the voltage of the power supply terminal VCC is, for example, 5 to 12 V.

Here, in the case where the opening/closing switch BSW1 is connected to the power supply terminal VCC side as illustrated in FIG. 8, with the opening/closing switch BSW1 closed, the external terminal potential VT1 is at high level that is substantially as high as the potential of the power supply terminal VCC, and with the opening/closing switch BSW1 open, the external terminal potential VT1 is at low level that is substantially equal to the ground potential; accordingly, the high level-low level relationship of the external terminal potential VT1 is reverse to that of the circuit configuration shown in FIG. 7.

Figure 9:
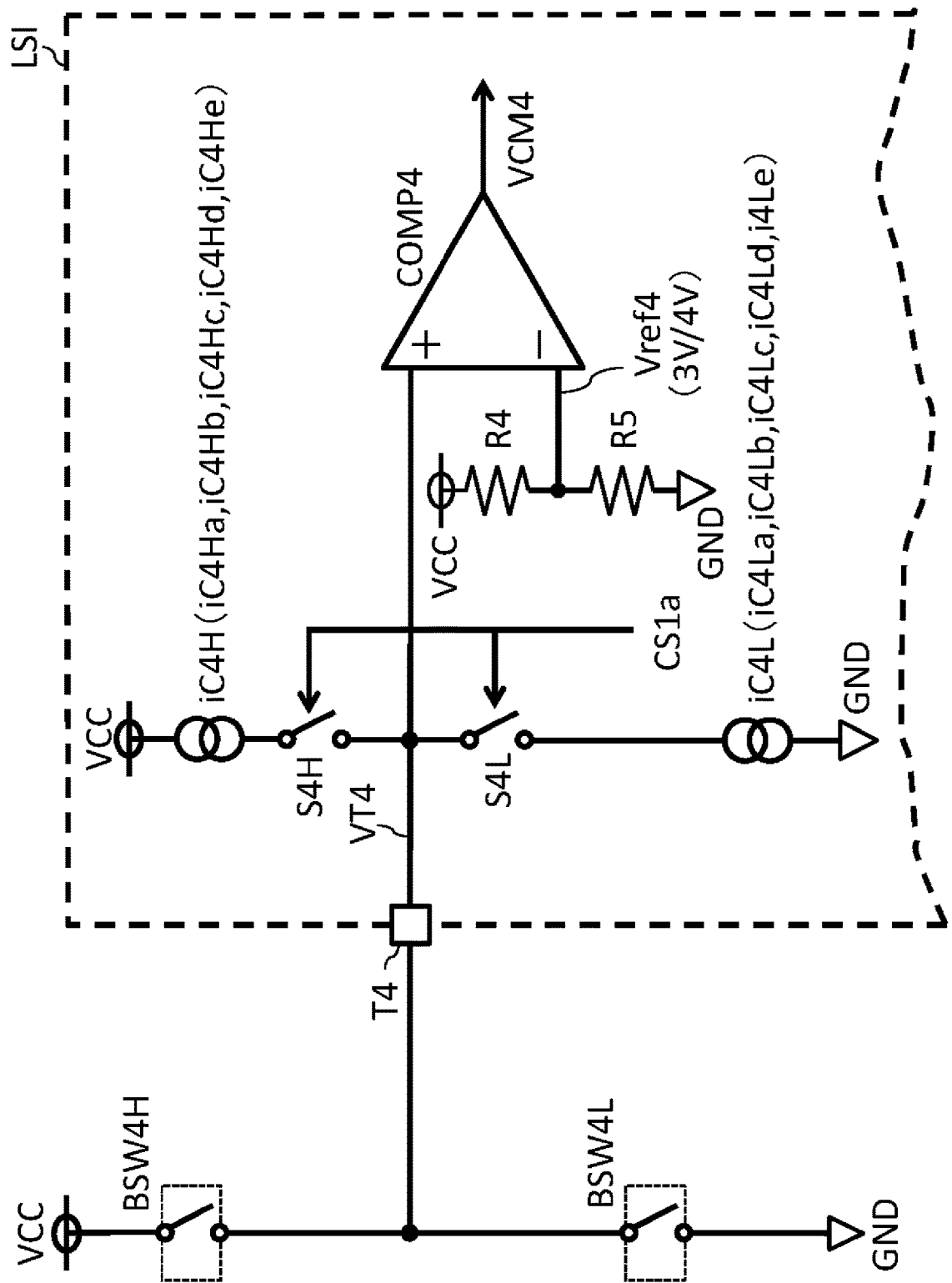
FIG. 9 is another configuration diagram illustrating how the internal current generator is connected to the opening/closing switch and to the comparator, all of which are illustrated in FIG. 6 and FIG. 7.

In FIG. 9, the power window P4 shown in FIG. 6 is taken as an example, and a state where the opening/closing switch BSW4, which is connected to the external terminal T4, is connected to the power supply terminal VCC side is illustrated along with a state where the opening/closing switch BSW4 is connected to the ground potential GND side. Although no such circuit configuration exists in the actual switch state detection circuit, this illustration is adopted for convenience of description. A pull-up opening/closing switch BSW4H is connected to the power supply terminal VCC side, and a pull-down opening/closing switch BSW4L is connected to the ground potential GND side. The detection of the open/closed state of the pull-up opening/closing switch BSW4H is performed by activating an internal current generator iC4L by means of a pull-down switch S4L, by comparing an external terminal potential VT4 of the external terminal T4 with a reference potential Vref4 by means of the comparator COMP4, and by detecting an output potential VCM4 of the comparator COMP4. The detection of the open/closed state of the pull-down opening/closing switch BSW4L is performed by activating an internal current generator iC4H by means of a pull-up switch S4H, by comparing the external terminal potential VT4 of the external terminal T4 with the reference potential Vref4 by means of the comparator COMP4, and by detecting the output potential VCM4 of the comparator COMP4. The activation of the pull-up switch S4H or the pull-down switch S4L is performed by the opening/closing control signal CS1a outputted from the logic circuit LOGIC. The reference potential Vref4 is set at resistors R4 and R5 to, for example 3 V or 4 V, which is equal to the reference potential Vref1 shown in FIG. 8.

As in the case shown in FIG. 8, it is not just a single kind of current that is generated by the internal current generator iC4L, but, for example, five kinds of currents iC4La, iC4Lb, iC4Lc, iC4Ld, and iC4Le having different current values are controlled and generated by a program at, for example, the logic circuit LOGIC. For example, the current values of the constant currents iC4La, iC4Lb, iC4Lc, iC4Ld, and iC4Le are respectively 1 mA, 3 mA, 5 mA, 10 mA, and 15 mA.

As in the case of the internal current generator iC4L, it is not just one kind of current that is generated by the internal current generator iC4H, either, but, for example, five kinds of currents iC4Ha, iC4Hb, iC4Hc, iC4Hd, and iC4He having different current values are controlled and generated by a program at, for example, the logic circuit LOGIC. For example, the current values of the constant currents iC4Ha, iC4Hb, iC4Hc, iC4Hd, and iC4He are respectively 1 mA, 3 mA, 5 mA, 10 mA, and 15 mA.

Descriptions have been given above, with reference to FIG. 6 to FIG. 9, of the switch state detection circuit and the vehicle-mounted switch system according to the present invention. It should be understood, however, that the embodiments of the present invention are not limited to what are described above. For example, FIG. 6 shows a configuration where one opening/closing switch is connected to one external terminal. However, for example, the external terminals T2 and T3 may be commonly connected, such that one opening/closing switch is connected to a common connection point. Needless to say, three or more external terminals may be commonly connected, such that one opening/closing switch is connected to a common connection point. According to such a configuration, in a case where, for example, a current of 15 mA is generated by one current generator, by commonly connecting three external terminals, it becomes possible to supply a current to an opening/closing switch having a current capacity of 45 mA, which is three times as large as 15 mA.

Further, as an alternative to the method where the external terminals of the semiconductor integrated circuit LSI are combined, for example, two or more semiconductor integrated circuits LSI according to the present invention may be prepared such that terminals related to them are commonly connected and one opening/closing switch is connected to a common connection terminal. For example, external terminals T1 of the semiconductor integrated circuits LSI are commonly connected, or the external terminals T2 of the semiconductor integrated circuits LSI are commonly connected, such that different opening/closing switches are connected to these common connection terminals. Such a circuit configuration is nothing but one obtained by replacing the external current generator CC1 and the external switch SW1 shown in FIG. 6 to FIG. 8 with the semiconductor integrated circuit LSI according to the present invention, and it contributes to flexibly and easily coping with adding, for example, an opening/closing switch for a large current and a switch for switching such an opening/closing switch. Accordingly, the switch state detection circuit and the vehicle-mounted switch system according to the present invention are capable of easily coping with adding an opening/closing switch based on the number of semiconductor integrated circuits according to the present invention and combinations of external terminal connections.

Synopsis:

To follow is a comprehensive description of the various embodiments disclosed herein.

According to one aspect of the present invention, a switch monitoring device includes a constant current source which supplies a current to an input line or extracts a current from the input line, a switch which connects the input line to a power supply voltage or to a ground voltage, a comparator which compares a voltage on the input line with a reference voltage, a logic which receives an output voltage of the comparator, a base current source which generates a base current, and a bias current circuit which generates a bias current by adjusting the base current as a base in accordance with a current control signal from the logic and the output voltage of the comparator. Here, the constant current source generates a current by adjusting the bias current as a base.

According to an embodiment of the switch monitoring device of the present invention, with the switch closed, the constant current source may generate a first current in accordance with a state of the bias current circuit, the state being set by the logic, and with the switch open, the constant current source may generate a second current in accordance with a state of the bias current circuit, the state being set by the output voltage.

According to an embodiment of the switch monitoring device of the present invention, the bias current circuit may be constituted with a current mirror circuit that is constituted with a transistor.

According to an embodiment of the switch monitoring device of the present invention, the transistor may be a MOS transistor.

According to an embodiment of the switch monitoring device of the present invention, the transistor may be a bipolar transistor.

According to an embodiment of the switch monitoring device of the present invention, when the switch to be controlled includes M switches (M is any integer equal to or greater than 2), M input lines, M comparators, M output voltages, M current control signals, M bias current circuits, and M constant current sources may be respectively prepared as the input line, the comparator, the output voltage, the current control signal, the bias current circuit, and the constant current source, and one base current source may be prepared as the base current source which generates the base current.

According to an embodiment of the switch monitoring device of the present invention, the base current source may be disposed in a central part of an integrated circuit.

According to an embodiment of the switch monitoring device of the present invention, the bias current circuit may be disposed close to the base current source.

According to an embodiment of the switch monitoring device of the present invention, the constant current sources may be disposed more outwardly than the bias current circuit in a scattered manner.

According to another aspect of the present invention, a switch system includes the switch monitoring device according to any one of the above embodiments, and further includes, a communicator which notifies an open/closed state of the switch to a microcomputer via serial communication.

According to another aspect of the present invention, a switch state detection circuit includes a first serial connection body in which an internal current generator and an internal switch are serially connected to each other, and a second serial connection body in which an external current generator and an external switch are serially connected to each other. Here, the first serial connection body is disposed inside a semiconductor integrated circuit, the second serial connection body is disposed outside the semiconductor integrated circuit, the semiconductor integrated circuit is provided with a plurality of external terminals, the first serial connection body and the second serial connection body are connected to a connection line via one of the external terminals, an opening/closing control signal for controlling the internal switch is extracted to one of the external terminals of the semiconductor integrated circuit, the opening/closing control signal is used to control opening/closing of the external switch so as to control the opening/closing of the internal switch and the opening/closing of the external switch in a manner interlocked with each other, at least one of a current generated by the internal current generator and a current generated by the external current generator is supplied to an opening/closing switch which is externally connected to the semiconductor integrated circuit and which is serially connected between the second serial connection body and a power supply terminal or between the second serial connection body and a ground potential, and a potential generated at the connection line or a current generated at the connection line is detected to detect open/closed state of the opening/closing switch. According to this aspect of the present invention, it is possible to easily handle adding a serial connection body including an opening/closing switch and an external switch.

According to an embodiment of the present invention, in the switch detection circuit, specifically the first serial connection body and the second serial connection body may be connected in parallel between the connection line and the power supply terminal or between the connection line and the ground potential. This makes it possible to supply to the opening/closing switch at least one of the current generated by the internal current generator and the current generated by the external current generator, and thus, even if one of the serial connection bodies malfunctions, it is possible to detect the open/closed state of the opening/closing switch by using the other serial connection body.

According to an embodiment of the present invention, in the switch state detection circuit, the external current generator may include a resistor, and the external switch may be constituted with a transistor. This circuit configuration contributes to simplification of the circuit configuration of the switch state detection circuit.

According to an embodiment of the present invention, in the switch state detection circuit, with the internal switch and the external switch both closed, the internal switch and the external switch may be controlled such that a current is supplied to the opening/closing switch from the internal current generator and from the external current generator. This makes it possible to reduce the magnitude of the current generated by the external current generator, and also to detect switch states even in a case where one of the internal switch and the external switch malfunctions or where one of the internal current generator and the external current generator malfunctions.

According to an embodiment of the present invention, in the switch state detection circuit, specifically the internal switch and the external switch may be controlled such that, after a current is supplied from the external current generator to the opening/closing switch, a current is supplied from the internal current generator to the opening/closing switch. Thereby, since the current generated by the internal current generator, which is of a relatively small current amount, is used during switch-state detection, it is possible to achieve power saving.

According to an embodiment of the present invention, in the switch state detection circuit, when a current is supplied to the opening/closing switch at least from the internal current generator, the potential on the connection line may be compared with a reference potential to detect the open/closed state of the opening/closing switch. This contributes to correct switch-state detection.

According to an embodiment of the present invention, in the switch state detection circuit, specifically the external current generator may generate a larger current than the internal current generator. This makes it possible to immediately handle a current increase in the opening/closing switch. Furthermore, by supplying a large current generated by the external current generator to the opening/closing switch, it is possible to prevent corrosion of the contact point of the closing/opening switch.

According to an embodiment of the present invention, in the switch state detection circuit, specifically the internal switch may include a transistor and the external switch may include a transistor of the same conductivity type as the transistor included in the internal switch. This makes it easy to achieve simplification of the circuit configurations of the internal switch and the external switch, and to achieve interlocking between an opening/closing switch controlled by the internal switch and an opening/closing switch controlled by the external switch.

According to an embodiment of the present invention, in the switch state detection circuit, the opening/closing switch may be a mechanical switch. This contributes to correct detection of the open/closed state of the mechanical switch which is adopted for use in vehicles and of which a contact point is comparatively vulnerable to corrosion and oxidation.

According to an embodiment of the present invention, the mechanical switch may specifically be at least one of a rocker switch, a push switch, a key lock switch, a rotary switch, a slide switch, a tactile switch, and a toggle switch. This makes it possible to use the switch state detection circuit of the present invention as a switch state detection circuit frequently used in vehicles.

According to another aspect of the present invention, a vehicle-mounted switch system includes the switch state detection circuit according to any one of the above embodiments, and a communicator which transmits a result of detection of the open/closed state of the opening/closing switch to the microcomputer via serial communication. This makes it possible to achieve compatibility with various communication protocols for vehicles.

According to an embodiment of the present invention, in the vehicle-mounted switch system, the opening/closing switch may specifically be a mechanical switch used in a vehicle body system. It is usable as a switch state detection circuit for use in a vehicle.

According to an embodiment of the present invention, in the vehicle-mounted switch system, the vehicle body system may specifically include at least one of the door (opening/closing) system, the door mirror system, the door lock system, the power window system, the wiper control system, and the seat adjustment system of a vehicle. This makes the vehicle-mounted switch system of the present invention preferable for detecting the states of vehicle-body-system opening/closing switches which are used comparatively frequently.

Advantageous Effects of Invention

According to the present invention, it is possible not only to reduce generation of EMI noise but also to cut power consumption in the switch monitoring device.

Furthermore, according to the present invention, even when an unexpected new opening/closing switch is added to the switch state detection circuit, it is possible to control the opening/closing of the opening/closing switch in a manner interlocked with the control of the opening/closing of the internal current generator provided inside the LSI. In particular, it becomes easy to add an opening/closing switch for a large current which is generated in accordance with, for example, the kind or the current capacity of the opening/closing switch.

INDUSTRIAL APPLICABILITY

The present invention relates to a power-saving switch monitoring device for use in vehicles, for example, where greater fuel economy is strongly demanded. Hence, the present invention has very high industrial applicability.

Furthermore, as has been discussed above, according to the present invention, it is possible to immediately handle addition of an unexpected new opening/closing switch and increase of current of an opening/closing switch, and thus to meet the wide range of demand for a switch state detection circuit and a vehicle-mounted switch system. Thus, the present invention has very high industrial applicability.

What is claimed is:

1. A switch monitoring device comprising:
a constant current source which supplies a current to an input line or extracts a current from the input line;
a switch which connects the input line to a power supply voltage or to a ground voltage;
a comparator which compares a voltage on the input line with a reference voltage;
a logic which receives an output voltage of the comparator;
a base current source which generates a base current; and
a bias current circuit having a first input to receive a current control signal from the logic and a second input to receive the output voltage of the comparator, wherein the bias current circuit generates a bias current by adjusting the base current as a base in accordance with the current control signal from the logic and the output voltage of the comparator,
wherein the constant current source generates a current by adjusting the bias current as a base.

2. The switch monitoring device according to claim 1, wherein
with the switch closed, the constant current source generates a first current in accordance with a state of the bias current circuit, the state being set by the logic, and
with the switch open, the constant current source generates a second current in accordance with a state of the bias current circuit, the state being set by the output voltage.

3. The switch monitoring device according to claim 1, wherein the bias current circuit is constituted with a current mirror circuit that is constituted with a transistor.

4. The switch monitoring device according to claim 3, wherein the transistor is a MOS transistor.

5. The switch monitoring device according to claim 3, wherein the transistor is a bipolar transistor.

6. The switch monitoring device according to claim 1, wherein when the switch to be controlled includes M switches, M being any integer equal to or greater than two, M input lines, M comparators, M output voltages, M current control signals, M bias current circuits, and M constant current sources are respectively prepared as the input line, the comparator, the output voltage, the current control signal, the bias current circuit, and the constant current source, and one base current source is prepared as the base current source which generates the base current.

7. The switch monitoring device according to claim 1, wherein the base current source is disposed in a central part of an integrated circuit.

8. The switch monitoring device according to claim 7, wherein the bias current circuit is disposed close to the base current source.

9. The switch monitoring device according to claim 8, wherein the constant current source is disposed more outwardly than the bias current circuit in a scattered manner.

10. A switch system comprising:
the switch monitoring device according to claim 1; and
a communicator which notifies an open/closed state of the switch to a microcomputer via serial communication.

11. A switch state detection circuit comprising:
a first serial connection body in which an internal current generator and an internal switch are serially connected to each other; and
a second serial connection body in which an external current generator and an external switch are serially connected to each other,
wherein
the first serial connection body is disposed inside a semiconductor integrated circuit,
the second serial connection body is disposed outside the semiconductor integrated circuit,
the semiconductor integrated circuit is provided with a plurality of external terminals,
the first serial connection body and the second serial connection body are connected to a connection line via one of the external terminals, an opening/closing control signal for controlling the internal switch is extracted to one of the external terminals of the semiconductor integrated circuit, the opening/closing control signal is used to control opening/closing of the external switch so as to control the opening/closing of the internal switch and the opening/closing of the external switch in a manner interlocked with each other, at least one of a current generated by the internal current generator and a current generated by the external current generator is supplied to an opening/closing switch other than the external switch, wherein the opening/closing switch is externally connected to the semiconductor integrated circuit and is serially connected between the second serial connection body and a power supply terminal or between the second serial connection body and a ground potential, and a potential generated at the connection line or a current generated at the connection line is detected to detect an open/closed state of the opening/closing switch.

12. The switch state detection circuit according to claim 11, wherein the first serial connection body and the second serial connection body are connected in parallel between the connection line and the power supply terminal or between the connection line and the ground potential.

13. The switch state detection circuit according to claim 11, wherein the external current generator includes a resistor, and the external switch is constituted with a transistor.

14. The switch state detection circuit according to claim 11, wherein with the internal switch and the external switch both closed, a current is supplied to the opening/closing switch from the internal current generator and from the external current generator.

15. The switch state detection circuit according to claim 11, wherein after a current is supplied to the connection line from the external current generator, a current is supplied to the connection line from the internal current generator.

16. The switch state detection circuit according to claim 11, wherein when a current is supplied to the opening/closing switch at least from the internal current generator, a potential on the connection line is compared with a reference potential to detect the open/closed state of the opening/closing switch.

17. The switch state detection circuit according to claim 11, wherein the external current generator generates a larger current than the internal current generator.

18. The switch state detection circuit according to claim 11, wherein the internal switch includes a transistor and the external switch includes a transistor of a same conductivity type as the transistor included in the internal switch.

19. The switch state detection circuit according to claim 11, wherein the opening/closing switch is a mechanical switch.

20. A vehicle-mounted switch system comprising:

the switch state detection circuit according to claim 11; and a communicator which transmits, to a microcomputer via serial communication, a result of detection of the open/closed state of the opening/closing switch.

* * * * *